US 6,606,147 B2

(12) United States Patent
Chiu et al.

(10) Patent No.: US 6,606,147 B2
(45) Date of Patent: Aug. 12, 2003

(54) MEASURING METHOD USING PHOTOELASTIC ANALYSIS FOR FINDING TOUCHING POINT BETWEEN BALL AND TRACK PROFILE

(75) Inventors: Yuen-Ling Chiu, Taichung (TW); Yuan-Fang Chen, Tainan (TW)

(73) Assignee: Hiwin Technologies Corp., Taichung (TW)

( * ) Notice: Subject to any disclaimer, the term of this patent is extended or adjusted under 35 U.S.C. 154(b) by 80 days.

(21) Appl. No.: 09/948,624

(22) Filed: Sep. 10, 2001

(65) Prior Publication Data

US 2003/0048431 A1 Mar. 13, 2003

(51) Int. Cl.⁷ .................................................. G01L 1/24

(52) U.S. Cl. .............................. 356/33; 356/32; 356/35
(58) Field of Search .............................. 356/32, 33, 35, 356/511, 601, 614, 625; 73/104, 105

Primary Examiner—Michael P. Stafira
Assistant Examiner—Vincent P. Barth
(74) Attorney, Agent, or Firm—Rosenberg, Klein & Lee

(57) ABSTRACT

The elaborately calculated method of the present invention using photoelastic analysis for finding contact relation between ball and track is characterized in that a photoelastic plate having a semi-circular section is used in measurement by observing contrast of stripes appeared thereon in stead of observing track profile from the plucked image of the object in conventional technique therefore being released from shortcoming of inaccurate measurement result due to vagueness of profile of plucked image.

9 Claims, 3 Drawing Sheets

MEASURING METHOD USING PHOTOELASTIC ANALYSIS FOR FINDING TOUCHING POINT BETWEEN BALL AND TRACK PROFILE

BACKGROUND OF THE INVENTION

1. Field of the Invention

The present invention relates to measuring method using photoelastic analysis for finding touching point between ball and track profile, in particular, to a measuring method for finding touching point between ball and track profile using a piece of photoelastic plate containing a semi-circular section.

2. Description of the Prior Art

In recent years, sliding motion is replaced by rolling or rotating motion in most of mechanical equipment for reducing frictional resistance and saving mechanical power as well. Among them devices such as ball screw, linear guide way and ball bearing are well known to people. In a rolling mechanism, the contact state between a ball and the track surface plays an important role on the working effect and quality of the rolling mechanism. Accordingly, measurement of the contact state of the two parts is not negligible.

Projection method and profile measurement method have been conventionally employed in mechanical engineering. The former is a method using a projector to project the image of a model ball having same size as a ball practically used in the machine that is placed on the track surface so as to observe the contact state between the model ball and the track surface and measure the angle formed between the center of the model ball and the touching point thereof. However, there is a practical shortcoming that only a vague image can be obtained owing to the fact the radius of the accurate cross section of the track is almost equal to that of the model ball, particularly in case of measuring a long linear guide way, difficulty in getting the focal point of the track profile line results in obtaining a vague track image, of course, exact touching point between the call and the track profile can not be determined.

The latter, in profile measurement method, the profile line of the track is measured by using a profile gage, and the touching point thereof is determined through computer evaluation. Meanwhile, ambient vibration and roughness of the track surface is almost equal to that of the model ball. In addition, the measuring point is vulnerable in case of encountering a part in the track surface with an abrupt change of curvature of the profile. FIG. 6 is a schematic view illustrating equipment includes a measuring rod 1 and a measuring point 11, as soon as the measuring point 11 has moved to the right along a track surface 21 of the measured object and reached the point A, the expensive point 11 might be broken by abrupt change of the profile thereat.

SUMMARY OF THE INVENTION

In order to cure the above depicted shortcomings, the present invention is to propose a newly developed measuring method using photoelastic analysis for finding touching point between ball and track profile.

In the present invention, a temporary birefringent material is used to form a photoelastic plate. The temporary birefringent material can divide an incident light into two mutually perpendicular polarized lights each passes through the object with a different speed. Some of originally optically monodirectional non-crystalloid are offered optical property as that of temporary birefringent material to divide an incident light into two mutually perpendicular polarized lights traveling through the object with different speeds when being exerted a force. After releasing the stress, the birefringent property thereof disappears. Such materials are conventionally employed in photoelastic analysis for simulating or measuring the amount and direction of stress applied on an object to be measured.

In the present invention, the photoelastic plate formed of such a temporary birefringent material is used to find touching point between the ball and the track profile. In order to simulate the contact state between the ball and track profile, a semicircular section is included in the photoelastic plate and the radius of the semi-circle is made equal to that of the ball. Furthermore, in order to evade inaccurate optical performance of the photoelastic plate arising from non-uniformity of thickness, thickness of the semi-circular section is made uniform. The birefringent phenomenon of the photoelastic plate under stress is observable by a common photoelastic measurement device. As an object is exerted by an concentrated force, the stress is greatest at the force exertion point, therefore, there can be observed a plurality of light stripes emerging outward from the stressed point. In the present invention, the maximum stressed point on the photoelastic plate, namely, the touching point between the ball and track profile can be found according to this principle. In this way, the method of the present invention does not have to directly observe the track profile of the actual track, instead, the aim of finding the touching point thereof can be achieved by observing photometrically contrasted stripes appeared on the photoelastic plate. Accordingly, shortcoming of unabling to obtain a clear track profile in the conventional projection method is overcome as such.

In the meanwhile, in order to avoid errors arising from observing with naked eyes, the present inventor suggest using a digital camera or the like to pluck the image of the photoelastic plate and treat the same with the aid of a computer to determine the contact point between the photoelastic plate and the object under measurement.

Before determining the coordinate of the contact point (touching point), at first the plucked image shall be oriented at its position. In two-dimensional coordinate system adopted by the present invention, the two factors, the origin and the X axis direction shall at first be predetermined. Meanwhile, the center of the semi-circular segment of the photoelastic plate is selected as the origin, while the horizontal extension of the measuring device is selected as the X axis direction so that the entire unit of the image plucking equipment is settled on the photoelastic measuring device. By so, at the beginning of measuring work, the image plucking equipment is aligned to the horizontal extension of the measuring device so that the X axis direction of the image can be used as reference for finding the touching point without seeking for another X axis. Of course, if there is a clear profile of the object can be measured, it can be considered the reference X axis.

As for determination of the center of the semi-circular section, there are two methods can be used. First, marking the center before measurement, and then finding this mark on the image of the photoelastic plate. The advantage of this method is that the desired center can be promptly found out, and can be calibrated in advance, on the other hand, it is not easy to find out the center position accurately. The second method is selecting three points (or favorably more points) at random o the plucked image corresponding to the points on the profile of the semi-circular section so as to determine the center. By connecting the touching point with the center of the semi-circle, the inclined angle of the touching point with respect to the center can be obtained.

There exists a score between boundary of images produced by two adjacent objects with different hues. In the present invention, the boundary is exhibited by means of filtering intermediate value using a computer to compare hues of the two adjacent images. If the hues of the two images are analogues, it shows that no boundary exists therebetween. On the other hand, if the two hues are distinguishably different, the boundary must exist therebetween.

For facilitating finding the touching point of the photoelastic plate and the object under measurement with the aid of a computer, two valued method is employed in the present invention to distinguish the image of the photoelastic plate and that of the object under measurement. For this purpose, a relevant critical value is selected for cooperating the hues of the two images, the one darker than the critical value is black colored, while the other one brighter than the critical value is white colored.

To enable a further understanding of the innovative and technological content of the invention herein, refer to the detailed description of the invention and the accompanying drawings appended below. Furthermore, the appended drawings are provided for purposes of reference and explanation, and shall not be construed as limitations applicable to the invention herein.

DETAILED DESCRIPTION OF THE PREFERRED EMBODIMENT

Figure 1:
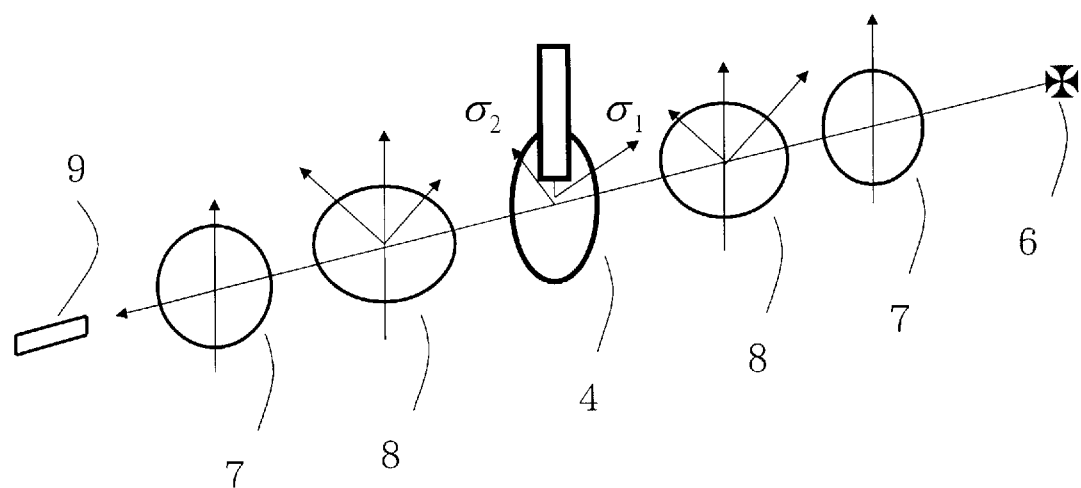
FIG. 1 is a schematic view showing the measuring device used in the present invention.

Referring to FIGS. 1, the measuring device used in the present invention comprises a light source 6, two pieces of polarizing plates 7, two quarter wave plates 8, a photoelastic plate 4, and one set of image plucking equipment 9. The measuring method comprises the steps: Setting the object under measurement on a photoelastic instrument such that the track surface of the object is aligned to the light emitting direction of the light source 6. Setting the photoelastic plate 4 perpendicularly on the track surface. The light emitted from the light source 6 is transformed to an unidirectional polarized light through the first polarizing plate 7 disposed proximal to the light source 6; then the polarized light is transformed to a circular polarized light after passing through the first quarter wave plates 8 for the purpose of deleting equi-inclination interference (e.g. producing dark stripe at 0° and 90° angle) of the photoelastic image. Then afterwards the circular polarized light passes through the photoelastic plate 4. In case the photoelastic plate 4 is unstressed, there will be no occurrence of bifringent Ophenomenon, but if any point of the photoelastic plate 4 is in touch with the track surface where produces stresses σ1 and σ2, the photoelastic plate 4 shows bifringent property thereby dividing the polarized light into two mutually perpendicular polarized lights passing through the photoelastic plate 4 respectively with different speed and inducing a phase difference between these two polarized lights. The two mutually perpendicular polarized lights successively pass through the second quarter wave plate 8 and second polarizing plate 7. Due to mutual interference between lights with different phases, there will produce stripes of intensified brightness and those of weakened brightness (dark) on the plucked image observable with the image plucking equipment. The semi-circular profile nearest the region with maximum stress is identified to be a touching position between the photoelastic plate 4 and the track surface. In the method according to the present invention, the touching point thereof can be easily recognized by merely observing and comparing contrast of stripes appeared on the photoelastic plate without the need of analyzing the plucked image. Besides, as the thickness of the photoelastic plate is so tiny compared to the track length so that focusing can be easily carried out during measurement work. Therefore, those problems encountered in conventional techniques as vagueness of track profile, affect of roughness of track and ambient vibration, and necessity of using expensive but vulnerable measuring rod and point are avoided in the present invention.

Figure 2:
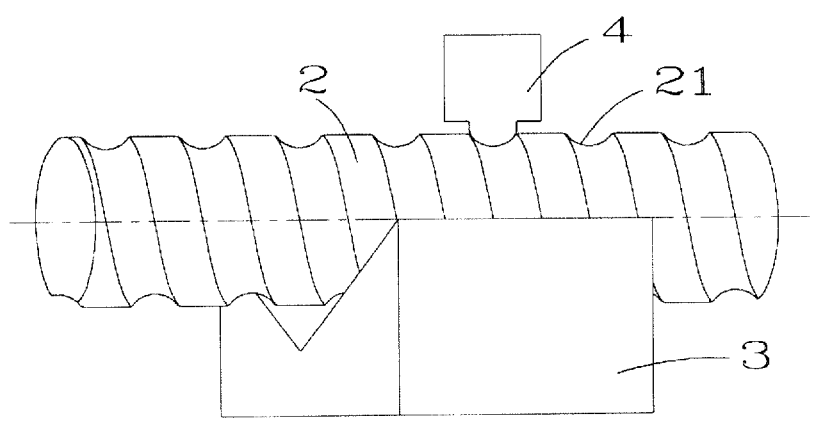
FIG. 2 is a schematic view illustrating how the method of the present invention is applied to a screw bolt.
Figure 3:
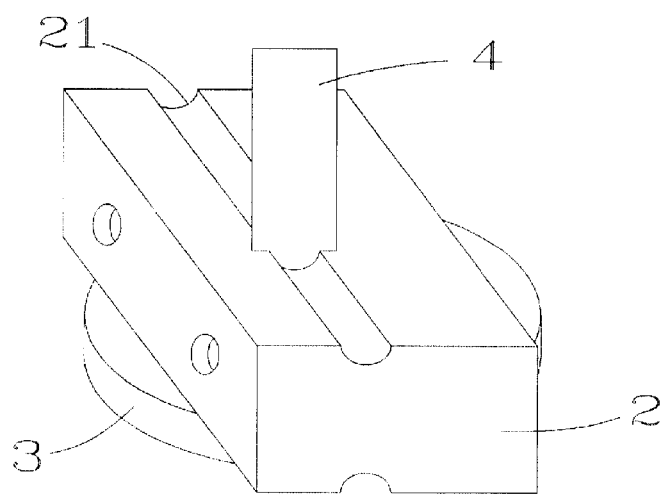
FIG. 3 is a schematic view illustrating how the method of the present invention is applied to a linear guide way.

FIGS. 2 and 3 respectly illustrate how the method of the present invention are applied to a screw bolt and a linear guide way. In FIG. 2, an object under measurement 2 (screw bolt) is placed on a removable and revolvable bracket 3 so as to facilitate adjusting a track surface 21 of the object 2 to extend along the direction of light, while the semi-circular section of the photoelastic plate 4 is disposed perpendicular on the track surface 21. In FIG. 3, the object under measurement 2 is placed on the favorably revolvable bracket 3 so as to facilitate adjusting the track surface 21 of the object 2 to extend along the direction of light, while the semi-circular section of the photoelastic plate 4 is disposed perpendicular on the track surface 21.

Figure 4:
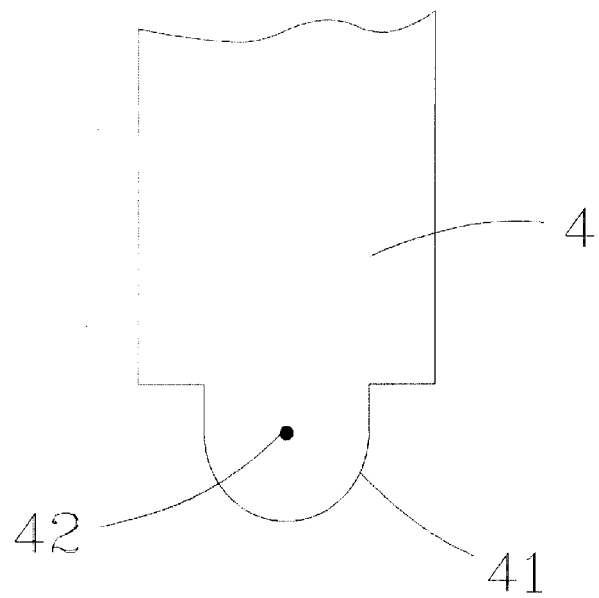
FIG. 4 is a schematic view of the photoelastic plate used in an embodiment of the present invention.
Figure 5:
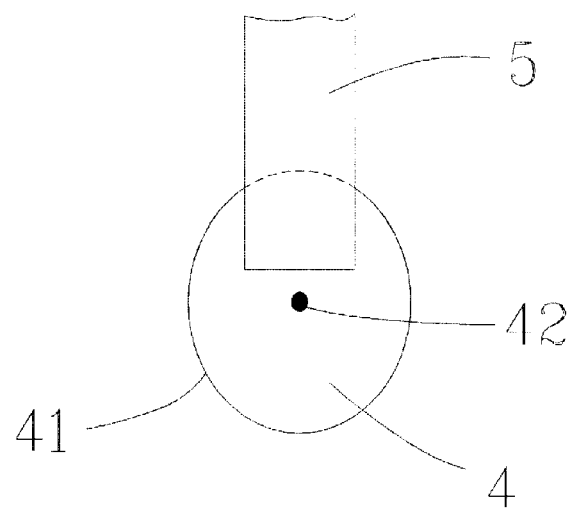
FIG. 5 is a schematic view of the photoelastic plate used in another embodiment of the present invention.
Figure 6:
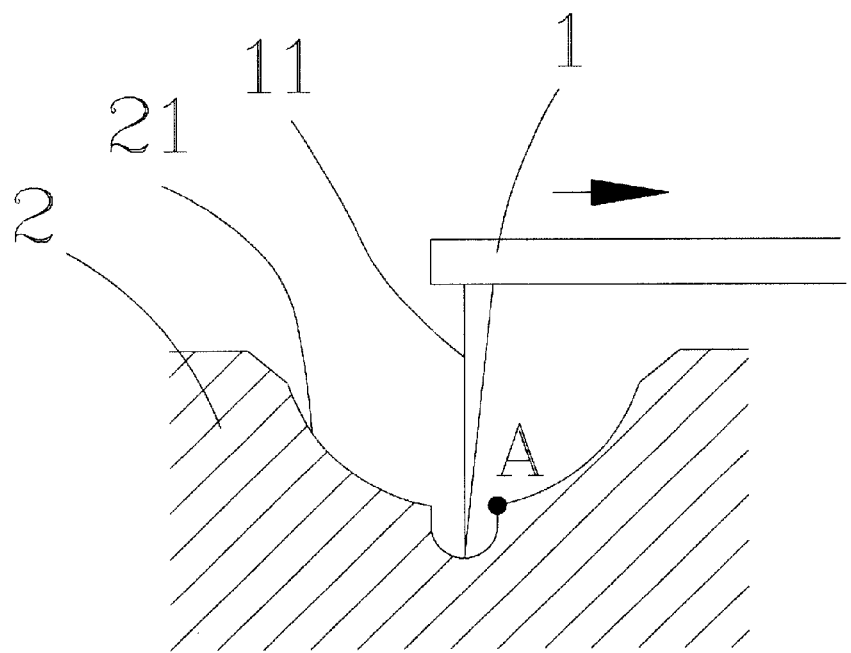
FIG. 6 is a schematic view illustrating a conventional method of measuring a track profile.

FIGS. 4 and 5 are two schematic views of the photoelastic plates respectively used in two embodiments of the present invention. The photelastic plate 4 shown in FIG. 4 has a semi-circular section 41 in its lower end having a center at point 42. This photoelastic plate 4 has an elongated strip shaped clamping end formed at its upper portion so as to facilitate clamping the photoelastic plate 4. The photoelastic plate 4 shown in FIG. 5 is formed into a circular plate 41 with a center at point 42. The photoelastic plate 4 formed in a circular plate 41 as such has a merit of easiness in forming with a good quality and low cost. On the contrary, an extra clamper 5 shall be provided for clamping the photoelastic plate 4.

It is understood from the description of the above examples that the invention has several noteworthy advantages that those problems encountered in conventional techniques such as vagueness of track profile in obtained image, affect of roughness of track and ambient vibration resulting in getting inaccurate measured data, and necessity of using expensive but vulnerable measuring rod and point are eliminated.

Many changes and modifications in the above described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A measuring method using photoelastic analysis for finding a touching point between a ball and track profile comprising the steps of:
   a. setting an object under measurement on a photoelastic instrument;
   b. setting a photoelastic plate at least containing a semi-circular profiled section on the track surface of said object, said semi-circularly profiled section having a radius of curvature equal to that of a rolling ball;
   c. applying a load on said photoelastic plate, said semi-circularly profiled section being thereby forced to contact the track surface of said object under measurement;
   d. capturing an image of said photoelastic plate with an image capturing device;
   e. analyzing said image so as to determine the center of said semi-circularly profiled section, and finding the contact position between said photoelastic plate and said object; and
   f. determining a contact relation between said ball and said track surface from said contact position and said center.

2. The method of claim 1, wherein a mark is made on the center of said semi-circularly profiled section so as to facilitate observing said image.

3. The method of claim 1, wherein intermediate value filtering method is employed for obtaining the profile of said image.

4. The method of claim 3, wherein three point method is applied on the circumference of said semi-circularly profiled section so as to find out the center of said semi-circularly profiled section.

5. The method of claim 1, wherein said image capturing device is a digital camera.

6. The method of claim 1, wherein said photoelastic plate is formed into a circular shape.

7. The method of claim 1, wherein said photoelastic instrument is composed of two polarizing plates.

8. The method of claim 7, wherein said photoelastic instrument is composed of two quarter wave plates.

9. The method of claim 1, wherein the contact relation between said track surface and said ball include an inclined angle of the line connecting said touching point and said center.

* * * * *